(12) United States Patent
Ko

(10) Patent No.: US 7,613,079 B2
(45) Date of Patent: Nov. 3, 2009

(54) TRAY LOAD/UNLOAD CONTROL SYSTEM AND METHOD

(75) Inventor: Yu-Cheng Ko, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 389 days.

(21) Appl. No.: 11/565,638

(22) Filed: Dec. 1, 2006

(65) Prior Publication Data

US 2007/0192775 A1    Aug. 16, 2007

(30) Foreign Application Priority Data

Feb. 16, 2006   (CN) .................. 2006 1 0033735

(51) Int. Cl.
    *G11B 17/22*   (2006.01)
(52) U.S. Cl. .................................. 369/30.32
(58) Field of Classification Search .... 369/30.27–30.37
    See application file for complete search history.

(56) References Cited

U.S. PATENT DOCUMENTS

| | | | | |
|---|---|---|---|---|
| 5,123,005 A | * | 6/1992 | Kurosu | .................. 720/602 |
| 6,005,833 A | * | 12/1999 | Yasuma et al. | ............... 720/602 |
| 6,169,711 B1 | * | 1/2001 | Koh | ........................ 369/30.36 |
| 6,378,860 B1 | * | 4/2002 | Gutierrez et al. | ............. 271/217 |
| 6,621,784 B2 | | 9/2003 | Liao et al. | |
| 6,643,240 B2 | * | 11/2003 | Chen | ........................ 369/53.3 |
| 7,447,120 B2 | * | 11/2008 | Chang | ..................... 369/30.27 |
| 2005/0249101 A1 | * | 11/2005 | Tokunaga | ................... 369/217 |

* cited by examiner

*Primary Examiner*—Thang V Tran
*Assistant Examiner*—Brenda Bernardi
(74) *Attorney, Agent, or Firm*—Winston Hsu

(57) ABSTRACT

A load/unload control system for a tray, the load/unload control system includes a control module and a drive module. The control module is used for controlling a voltage, the control module includes a storage unit for storing instructions and an output unit constructed and arranged for reading the instructions from the storage unit and outputting the instructions. The drive module is coupled to the drive module for supplying the voltage adapted to move the tray based on the instructions, the instructions comprising at least one step-up voltage instruction for increasing the voltage during a load process and at least one step-down voltage instruction for decreasing the voltage during an unload process. A related control method for controlling a voltage to load/unload a tray is also provided.

20 Claims, 8 Drawing Sheets

TRAY LOAD/UNLOAD CONTROL SYSTEM AND METHOD

BACKGROUND OF THE INVENTION

1. Field of the Invention

This invention relates to a disc drive having a tray, and more particularly to a load/unload control system and a method for loading/unloading the tray.

2. Description of Related Art

Optical disc drives, such as video compact disc (VCD) players, digital versatile disc (DVD) players, or computer data disc reading/writing drives are widely used for recording information onto and/or reproducing information from discs.

Most optical disc drives use trays to load and unload the discs. As shown in FIG. 7, a portion of a traditional optical disc drive 10 is illustrated. The optical disc drive 10 includes a tray 12, a gear train 14, and a motor 16. The motor 16 connects to the gear train 14 with a belt 18. A driven gear of the gear train 14 meshes with a gear rack 122 formed on the tray 12.

The motor 16 drives the gear train 14 to rotate so as to bring the tray 12 to move between a close position and an open position. When the tray 12 ejects out of the optical disc drive 10 to the open position, an optical disc (not shown) can be placed on/removed from the tray 12. When the tray 12 moves into the optical disc drive 10 to the close position, the optical disc drive 10 can reproduce/record information from/on the optical disc.

A moving speed of the tray 12 is determined by a rotational speed of the motor 16, and the rotational speed of the motor 16 is controlled by a voltage supplied to the motor 16. In other words, the voltage applied to the motor 16 determines the moving speed of the tray 12.

Referring also to FIG. 8, a constant voltage is applied to drive the motor 16. In order to shorten a(n) load/unloading time, the constant voltage is usually set to a relatively high voltage value. When the optical disc drive 10 starts loading the tray 12 from the open position, the voltage increases from zero to a relatively high voltage value instantaneously. The motor 16 accelerates to a high rotational speed in a very short time, driving the tray 12 to reach the moving speed from rest at a relatively high acceleration. This may produce unwanted vibrations on the tray 12 because the tray 12 extended out of the disc drive 10, an extended portion of the tray 12 is not supported by the disc drive 10. Similarly, during the end of an unload process, the constant voltage is terminated instantaneously when the tray 12 reaches the open position, the extended portion of the tray 12 lacks support and vibrations may also occur as the tray 12 stops suddenly from a high speed.

Therefore, a load/unload control method which is capable of reducing the unwanted vibrations is desired.

SUMMARY OF THE INVENTION

A load/unload control system for a tray, the load/unload control system includes a control module and a drive module. The control module is used for controlling a voltage, the control module includes a storage unit for storing instructions and an output unit constructed and arranged for reading the instructions from the storage unit and outputting the instructions. The drive module is coupled to the drive module for supplying the voltage adapted to move the tray based on the instructions, the instructions comprising at least one step-up voltage instruction for increasing the voltage during a load process and at least one step-down voltage instruction for decreasing the voltage during an unload process.

A load/unload control method for controlling a voltage to load/unload a tray includes steps of: supplying a voltage to load/unload the tray; increasing the voltage gradually during a load process; and decreasing the voltage gradually during an unload process.

Other advantages and novel features will become more apparent from the following detailed description of preferred embodiments when taken in conjunction with the accompanying drawings, in which:

BRIEF DESCRIPTION OF THE DRAWINGS

Many aspects of the load/unload control system and method can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE INVENTION

Reference will now be made to the drawings to describe the preferred embodiment of the present load/unload control system, in detail.

Figure 1:
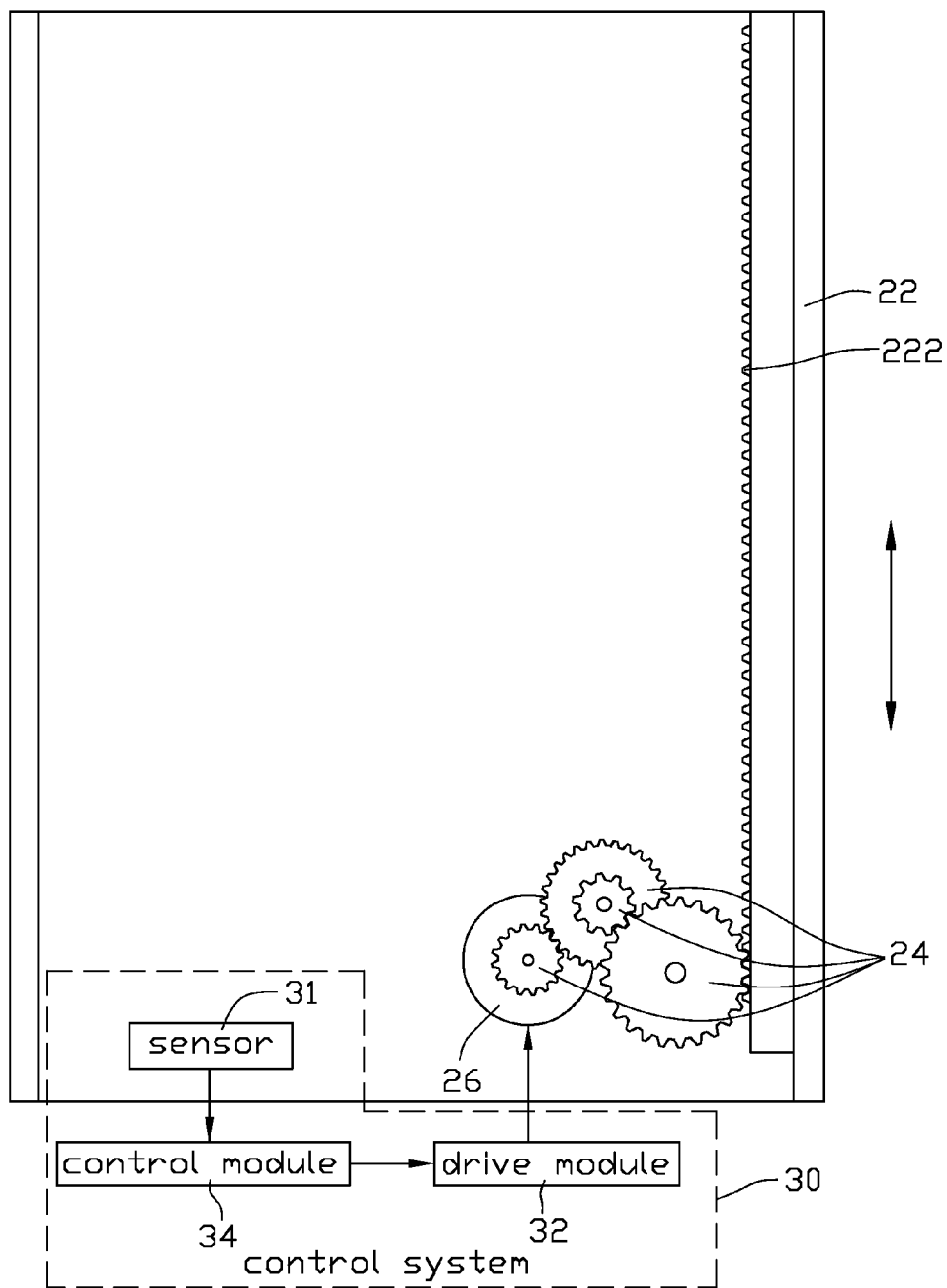
FIG. 1 is a schematic diagram of an optical disc drive in accordance with an exemplary embodiment, the optical disc drive including a motor and a load/unload control system.

Referring to FIG. 1, an optical disc drive 20 includes a tray 22, a gear train 24, a motor 26, a load/unload control system (hereinafter referring to as control system) 30. A driven gear of the gear train 24 meshes with a gear rack 222 formed on a side of the tray 22. The motor 26 drives the gear train 24 to move the tray 22 between two final positions. The two final positions include an open position where an optical disc can be placed on or removed from the tray 22 and a close position where a recording and reproducing process can operate.

Figure 2:
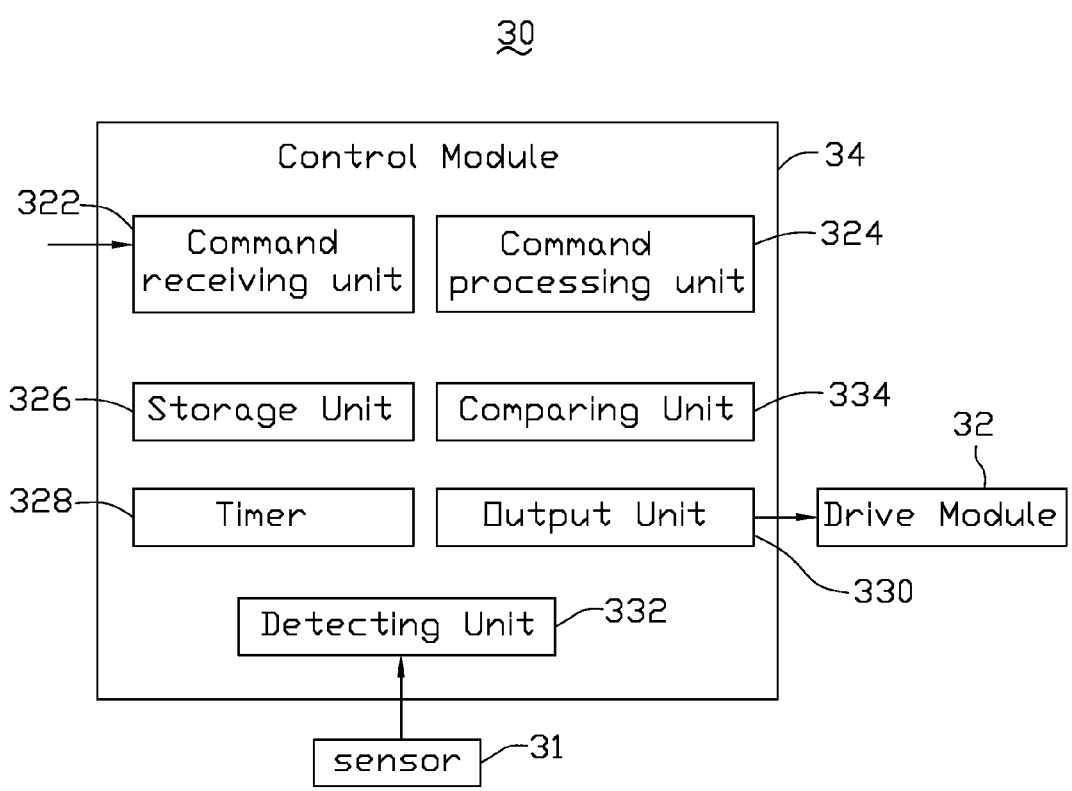
FIG. 2 is a block diagram illustrating the tray load/unload control system of FIG. 1.

Referring also to FIG. 2, the control system 30 includes a sensor 31, a drive module 32, and a control module 34.

The sensor 31 is disposed in the optical disc drive 20, configured for detecting the final positions of the tray and for generating signals indicating whether the tray 22 has reached the close position or the open position.

The drive module 32 is constructed and arranged for supplying a close-tray voltage to the motor 26, thus driving the tray 22 to move toward the close position, and for supplying an open-tray voltage to the motor 26, thus driving the tray 22 to move toward the open position.

The control module 34 is electrically coupled with the drive module 32 to send instructions to the drive module 32 so as to control the close-tray/open-tray voltage supplied by the drive module 32. Both the close-tray voltage and the open-tray voltage values applied to the motor 26 are controllable, and are based on the instructions sent by the control module

34. The values of the close-tray/open-tray voltage determine a rotational speed of the motor 16, so as to determine a moving speed of the tray 22.

The control module 34 includes a command receiving unit 322, an command processing unit 324, a storage unit 326, a timer 328, an output unit 330, a detecting unit 332, and a comparing unit 334.

The command receiving unit 322 is used to receive an external command inputted from an outer device (not shown). The external command may be received after pressing a front panel button (not shown) of the optical disc drive 20 or from a signal through an advanced technology attachment packet interface (ATAPI) of a computer device.

The command processing unit 324 is used for identifying whether a type of the external command received by the command receiving unit 322 is a load command or an unload command. Based on the type of the external command, the control module 34 sends the instructions to the drive module 32 to supply the close-tray voltage or the open-tray voltage accordingly.

The storage unit 326 stores a series of load instructions that control the close-tray voltage and a series unload instructions that control the open-tray voltage. The output unit 330 reads the load/unload instructions from the storage unit 326 based on the type of the external command identified by the command processing unit 324 and then sends the load/unload instructions to the drive module 32. The series of load instructions include at least one step-up voltage instruction that increases the close-tray voltage during a load process. The series of unload instructions include at least one step-down voltage instruction that decreases the open-tray voltage during an unload process.

The timer 328 is constructed and arranged for timing a duration during which an instruction is outputted by the output unit 330.

The comparing unit 334 is used for comparing the duration timed by the timer 328 with an output time of the instruction. If the duration reaches the output time of the instruction, the comparing unit 334 signals the output unit 330 to stop outputting the instruction.

The detecting unit 332 is used to detect the signals generated by the sensor 31. When the tray 22 reaches the close position, the sensor 31 generates a first signal and transmits the first signal to the detecting unit 332. When the detecting unit 332 detects the first signal, the detecting unit 332 signals the output unit 332 to stop outputting the load instructions to the drive module 32. Thus the drive module 32 stops supplying the close-tray voltage to the motor 26, thereby the motor 26 stops rotating. Similarly, when the tray 22 reaches the open position, a second signal is generated and transmitted to the detecting unit 332. After detecting the second signal, the detecting unit 332 signals the output unit 332 to stop outputting the unload instructions so as to stop moving the tray 22.

Figure 5:
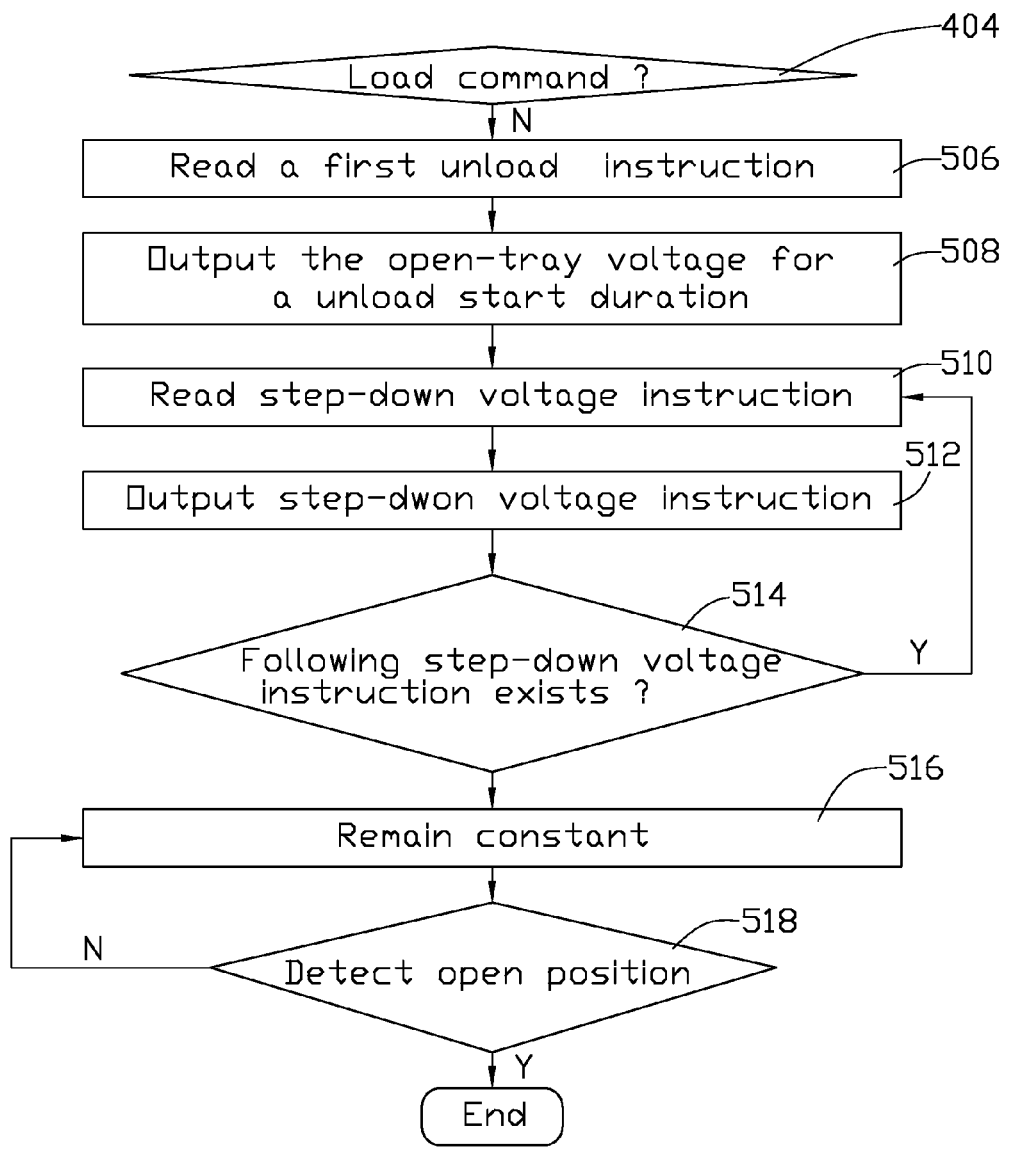
FIG. 5 is a flowchart of an exemplary process of an unload control method.

After receiving the external command, the operation of the control system 30 will be described in detail with reference to FIG. 3 and FIG. 5 where an exemplary procedure of a controlling method of loading and unloading the tray 22 is illustrated.

Figure 3:
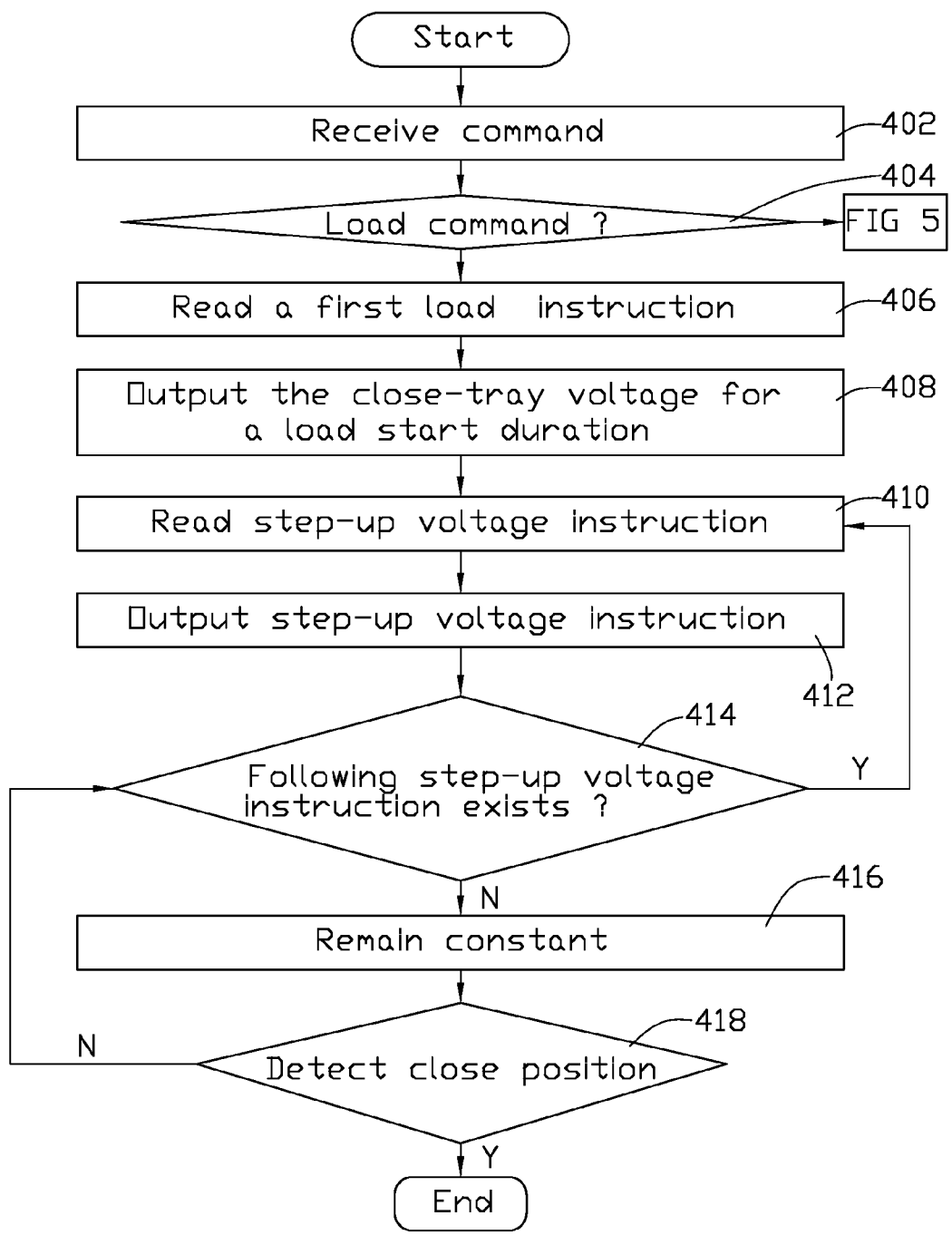
FIG. 3 is a flowchart of an exemplary process of a load control method.

Referring to FIG. 3, in step 402, the command receiving unit 322 receives an external command. The external command may be generated from a button pressed by an user or an ATAPI of a computer device.

In step 404, the command processing unit 324 identifies the type of the external command.

In step 406, if the external command is the load command, the output unit 330 reads a first load instruction of the series of load instructions from the storage unit 326.

In step 408, the drive module 32 outputs the close-tray voltage to the motor 26 corresponding the first load instruction. The drive module 32 outputs the close-tray voltage for a load start duration corresponding the first load instruction.

Figure 4:
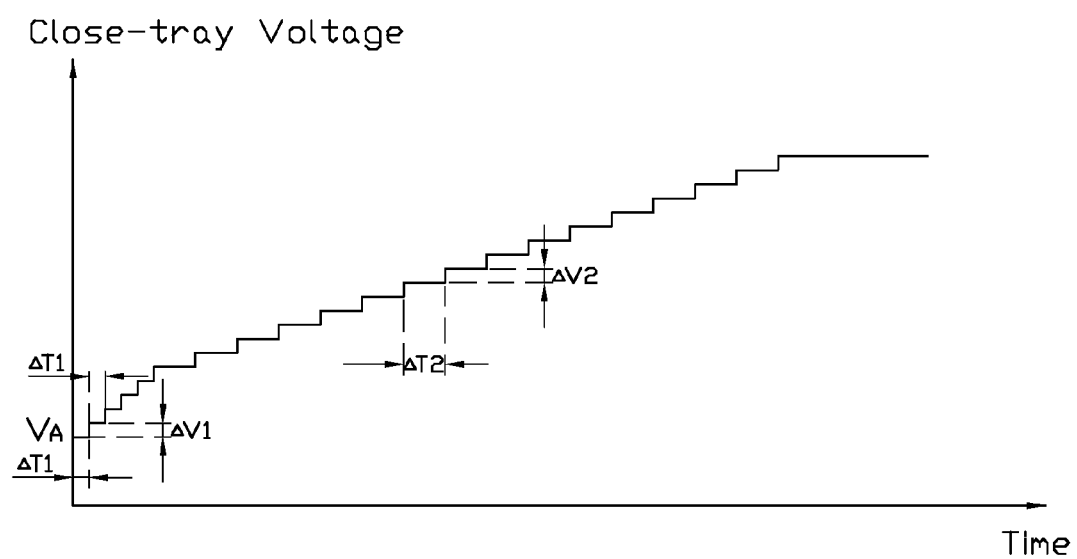
FIG. 4 is a graph showing a waveform of a close-tray voltage applied to the motor of FIG. 1 as a function of time during when the tray is being loaded into the disk drive.

Referring also to FIG. 4, a voltage value controlled by the first load instruction is VA and the load start duration corresponding the first load instruction is $\Delta T1$. Preferably, the voltage value VA is a minimum voltage that can drive the motor 26 to start rotating. Since the voltage value VA is relatively low, the motor 26 starts rotating at a relatively low speed and the tray 22 moves smoothly.

In step 410, the output unit 330 reads a first step-up voltage instruction of the series of load instructions from the storage unit 326.

In step 412, the output unit 330 outputs the first step-up voltage instruction to the drive module 32, thus, the drive module 32 steps up the close-tray voltage. As shown in FIG. 4, a first duration of the first step-up voltage instruction is depicted with $\Delta T1$ as an example. A voltage difference in the close-tray voltage before and after stepping up is depicted with $\Delta V1$, that is, the close-tray voltage value is stepped up to $VA+\Delta V1$.

In step 414, if a following step-up voltage instruction of the series of load instructions exists, the procedure then returns to step 412 The output unit 330 reads the following step-up voltage instruction to step up the close-tray voltage. It should be noted that an amount of repetition between step 410 and step 414 may vary according to different optical disc drives. An amount of stepping up of the close-tray voltage is determined by the number of the step-up voltage instructions in the series of load instructions. Increments and durations of different step-up voltage instructions may also vary. For example, a second increment $\Delta V2$ and a second duration $\Delta T2$ are shown in FIG. 4, the second duration $\Delta T2$ is longer than the first duration $\Delta T1$. During the second duration $\Delta T2$, the close-tray voltage is controlled to remain constant. If no more following step-up voltage instruction of the series of load instructions is read in step 414, the procedure then proceeds to step 416.

In step 416, the output unit 330 continues outputting the close-tray voltage according to a final load instruction of the series of load instructions. I.e., the close-tray voltage outputted from the drive module 32 remains constant.

In step 418, the control module 34 judges whether the detecting unit 332 has received the first signal indicating the tray 22 has reached the close position. If the tray 22 has not reached the close position, the procedure then returns to step 416. If the tray 22 has reached the close position, the procedure is terminated.

When the tray of the optical disk drive 20 begins to close, the close-tray voltage controlled by the load instructions is configured to be relatively low, and the motor 26 starts rotating at a relatively low speed. Thus, an acceleration of moving the tray 22 to start loading is kept relatively low accordingly, and unwanted vibrations due to the relatively high acceleration of moving the tray 22 is reduced.

During the load process, increments of the close-tray voltage controlled by the step-up voltage instructions are configured to be great enough to drive the motor 26 to accelerate at a proper rate so as to increase the moving speed of the tray 22, but small enough to prevent the tray 22 from vibration. Thus the moving speed of the tray 22 increases gradually and the tray 22 accelerates smoothly.

If in step 404, the external command received by the command receiving unit 322 is an unload command, the procedure then proceeds to step 506.

In step 506, the output unit 330 reads a first unload instruction of the series of unload instructions from the storage unit 326.

In step 508, the drive module 32 outputs the open-tray voltage to the motor 26 based on the first unload instruction.

The drive module 32 outputs the open-tray voltage for an unload start duration corresponding the first unload instruction.

In step 510, the output unit 330 reads a first step-down voltage instruction of the series of unload instructions from the storage unit 326.

Figure 6:
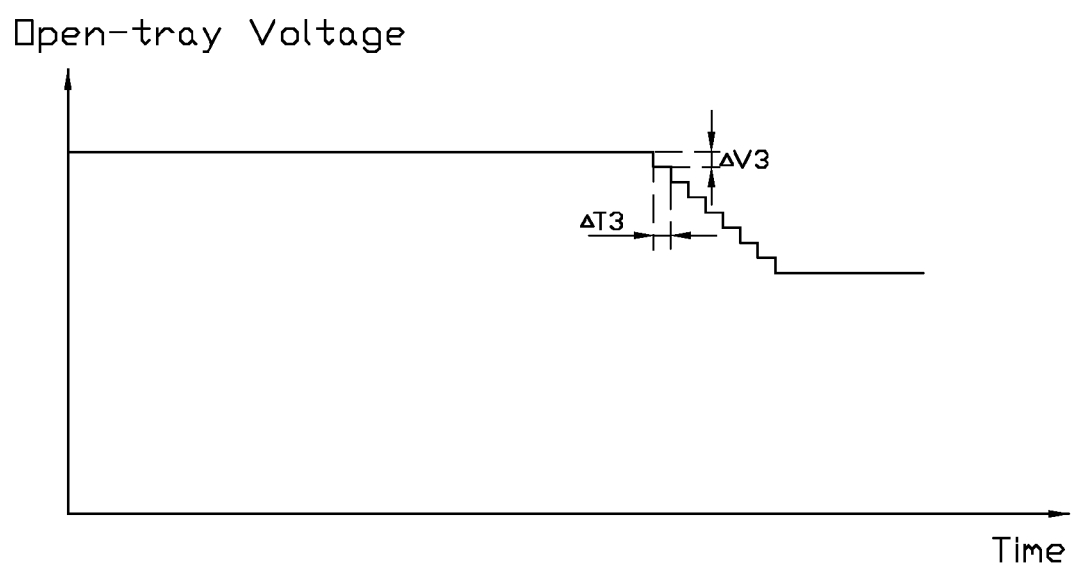
FIG. 6 is a graph showing a waveform of an open-tray voltage applied to the motor of FIG. 1 as a function of time during when the tray is being unloaded into the disk drive.
Figure 7:
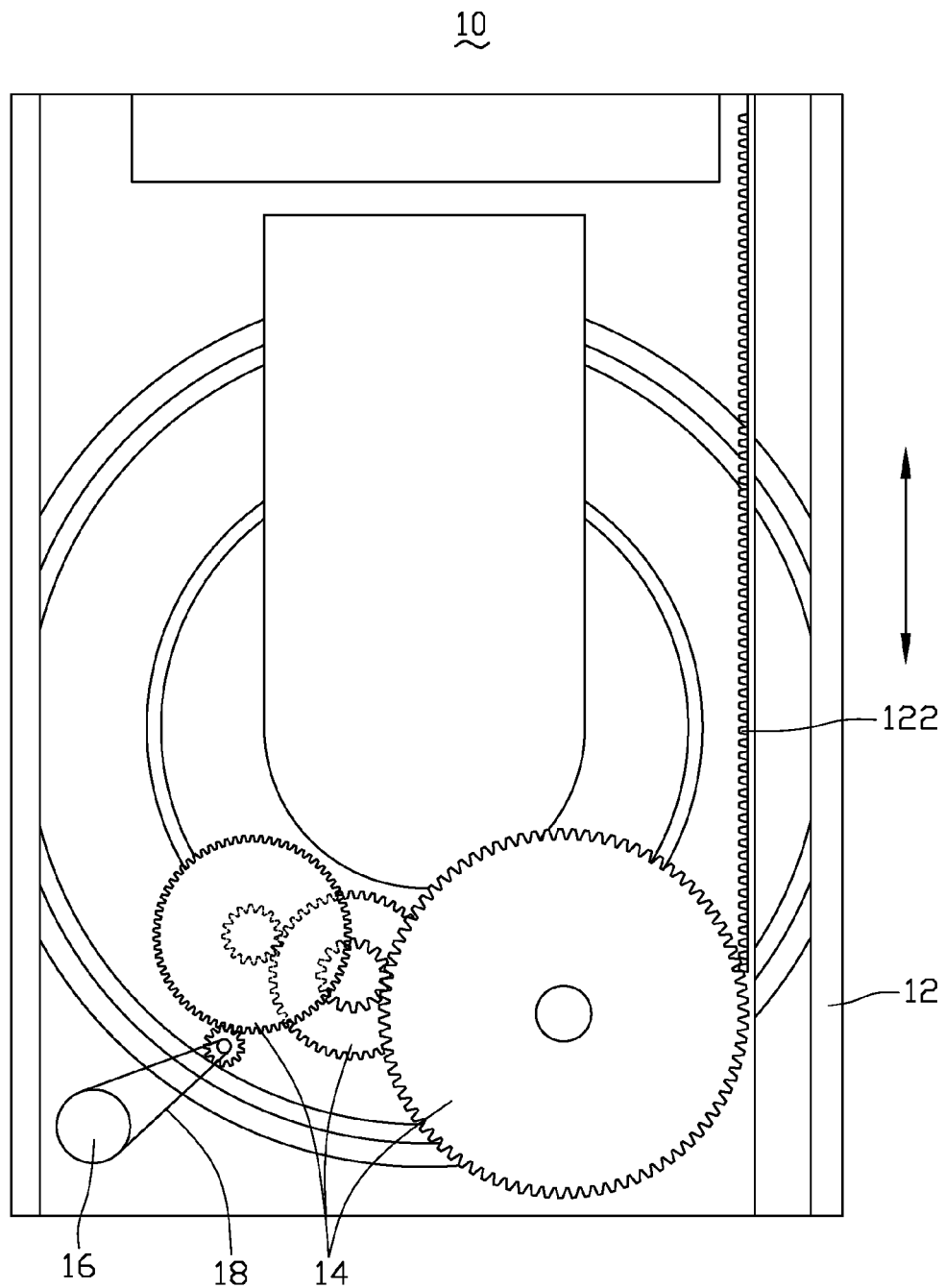
FIG. 7 is a plan view of a traditional optical disc drive, the traditional optical disc drive including a motor.
Figure 8:
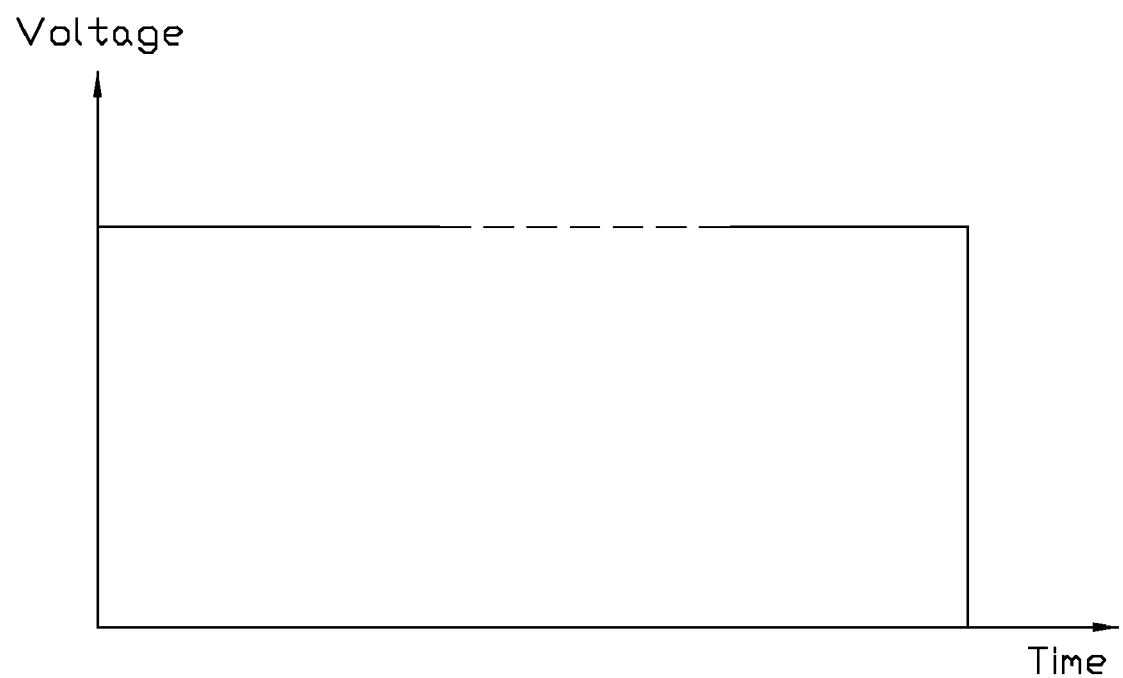
FIG. 8 is a schematic diagram showing a constant voltage applied to the motor of FIG. 7.

In step 512, the output unit 330 outputs the first step-down voltage instruction to the drive module 32, thus, the drive module 32 steps down the open-tray voltage. After that, the open-tray voltage is outputted to the motor 26 for a third duration corresponding the first step-down voltage instruction. Referring also to FIG. 6, the third duration corresponding the first step-down voltage instruction is depicted as $\Delta T3$ and a difference of the open-tray voltage before and after stepping down is depicted with $\Delta V3$. During the third duration $\Delta T3$, the open-tray voltage is controlled to remain constant.

In step 514, if a following step-down voltage instruction of the series of unload instructions exists, the procedure then returns to step 512. The output unit 330 reads the following step-down voltage instruction to step down the open-tray voltage. It should be noted that an amount of repetition between step 510 and step 514 may vary according to different optical disc drives. An amount of stepping down of the open-tray voltage is determined by the number of the step-down voltage instructions in the series of unload instructions. Decrements and durations of different step-down voltage instructions may also vary. If no more following step-down voltage instruction is read in step 514, the procedure then proceeds to step 516.

In step 516, the output unit 330 continues outputting the open-tray voltage according to a final unload instruction of the series of unload instructions. I.e., the open-tray voltage outputted from the drive module 32 remains constant.

In step 518, the control module 34 judges whether the detecting unit 332 has received the second signal indicating the tray 22 has reached the open position. If the tray 22 has not reached the open position, the procedure then returns to step 516. If the tray 22 has reached the open position, the procedure is terminated.

During the unload processes, decrements of the open-tray voltage controlled by the step-down voltage instructions are configured to be great enough to drive the motor 26 to decelerate at a proper rate so as to decrease the moving speed of the tray 22, but small enough to prevent the tray 22 from vibration. Thus the moving speed of the tray 22 decreases gradually and the tray 22 can decelerate smoothly.

During an end of the unload process, the open-tray voltage controlled by the unload instructions is decreased to be relatively low. Thus a deceleration of stop moving the tray 22 is kept relatively low accordingly, and unwanted vibrations due to a high deceleration are also reduced.

The embodiments described herein are merely illustrative of the principles of the present invention. Other arrangements and advantages may be devised by those skilled in the art without departing from the spirit and scope of the present invention. Accordingly, the present invention should be deemed not to be limited to the above detailed description, but rather by the spirit and scope of the claims that follow, and their equivalents.

What is claimed is:

1. A load/unload control system for a tray, the load/unload control system comprising:
    a control module for controlling a voltage, the control module comprising a storage unit for storing instructions and an output unit constructed and arranged for reading the instructions from the storage unit and outputting the instructions; and
    a drive module coupled to the control module for supplying the voltage adapted to move the tray based on the instructions, the instructions comprising at least one step-up voltage instruction for increasing the voltage during a load process and at least one step-down voltage instruction for decreasing the voltage during an unload process;
    wherein the control module comprises a timer and a comparing unit, the timer is used for timing a duration during which an instruction is output by the output unit, and the comparing unit is used for comparing the duration timed by the timer with an output time of the instruction.

2. The load/unload control system as claimed in claim 1, wherein the voltage increases by an increment after a predetermined duration during the load process.

3. The load/unload control system as claimed in claim 1, wherein the voltage decreases by a decrement after a predetermined duration during the unload process.

4. The load/unload control system as claimed in claim 1, wherein the control module comprises an command receiving unit for receiving an external command, the external command being used for activating a staff of the load process or the unload process.

5. The load/unload control system as claimed in claim 4, wherein the control module comprises a command processing unit for identifying the external command type as a load command for activating the start of the load process or an unload command for activating the start of the unload process.

6. The load/unload control system as claimed in claim 1, wherein the instructions comprise load instructions for controlling the tray to load, and unload instructions for controlling the tray to unload.

7. The load/unload control system as claimed in claim 1, wherein the voltage applied by the drive module to load the tray during the load process comprises a first increasing stage and a second increasing stage, the first increasing stage includes multiple first steps and the second increasing stage includes multiple second steps, each of the first steps in the first increasing stage defines a first time interval, the loading voltage remains constant during the first time interval, each of the second steps in the second increasing stage defines a second time interval, the loading voltage remains constant during the second time interval, the first time interval is different from the second time interval.

8. The load/unload control system as claimed in claim 1, wherein the voltage applied by the drive module to unload the tray during the unload process comprises a decreasing stage, the decreasing stage comprises at least one time interval, and the voltage is constant during the at least one time interval.

9. The load/unload control system as claimed in claim 1 wherein the comparing unit signals the output unit to stop outputting the instruction if the duration reaches the output time of the instruction.

10. The load/unload control system as claimed in claim 1, wherein the control module comprises a detecting unit for detecting a signal which is generated by a sensor and indicates the tray has reached a close/open position.

11. The load/unload control system as claimed in claim 10, wherein the control module controls the drive module to stop supplying the voltage when the detecting unit detects the tray has reached the close/open position.

12. A control method for controlling a voltage to load/unload a tray, comprising:
    supplying a voltage to load/unload the tray;
    increasing the voltage gradually during a load process;
    controlling the voltage to remain constant for a predetermined duration after increasing the voltage by an increment; and
    decreasing the voltage gradually during an unload process.

13. The control method as claimed in claim 12, wherein the step of supplying comprises steps of:
  receiving an external command; and
  identifying whether the external command is a load command for activating a start of the load process or an unload command for activating a start of the unload process.

14. The control method as claimed in claim 13, wherein the step of supplying comprises steps of:
  reading load instructions from a storage unit if the external command is the load command; and
  outputting the load instructions to a drive module to control the drive module to supply the voltage.

15. The control method as claimed in claim 13, wherein the step of supplying comprises steps of:
  reading unload instructions from a storage unit if the external command is the unload command; and
  outputting the unload instructions to a drive module to control the drive module to supply the voltage.

16. The control method as claimed in claim 12, wherein the step of increasing the voltage gradually during a load process comprises steps of:
  increasing the voltage by a first increasing stage, the first increasing stage comprising multiple first steps, each of the first steps in the first increasing stage defining a first time interval, the voltage remaining constant during the first time interval; and
  increasing the voltage by a second increasing stage, the second increasing stage comprising multiple second steps, each of the second steps in the second increasing stage defining a second time interval, the voltage remaining constant during the second time interval, the first time interval being different from the second time interval.

17. The control method as claimed in claim 12, comprising steps of:
  determining whether there are more than one step-up voltage instruction; and
  increasing the voltage more than one times if there are more than one step-up voltage instruction and controlling the voltage to remain constant for the predetermined duration.

18. The control method as claimed in claim 12, comprising steps of:
  controlling the voltage to remain constant for a predetermined duration after decreasing the voltage by a decrement.

19. The control method as claimed in claim 18, comprising steps of:
  determining whether there are more than one step-down voltage instruction; and
  decreasing the voltage more than one times if there are more than one step-down voltage instruction and controlling the voltage to remain constant for the predetermined duration.

20. The control method as claimed in claim 12, comprising steps of: determining whether the tray reaches a close/open position; stopping supplying the voltage if the tray reaches the close/open position.

* * * * *